United States Patent [19]

Humbert

[11] E Re. 28,918

[45] Reissued July 27, 1976

[54] COMPONENTS OF A ROTARY PISTON MACHINE

[75] Inventor: Gerhard Philipp Humbert, Margarethenhohe Uber Konigswinter, Germany

[73] Assignee: Electrophysikaische Anstalt Bernard Berghaus, Vaduz, Liechtenstein

[22] Filed: Mar. 11, 1974

[21] Appl. No.: 449,997

Related U.S. Patent Documents

Reissue of:

[64] Patent No.: 3,728,051
Issued: Apr. 17, 1973
Appl. No.: 89,589
Filed: Nov. 16, 1970

[30] Foreign Application Priority Data

Dec. 12, 1969 Switzerland ..... 18507/69

[52] U.S. Cl. ..... 418/178; 148/16.6; 148/31.5; 204/164; 204/177

[51] Int. Cl.[2] ..... B01K 1/00; C23C 11/16

[58] Field of Search ..... 148/16.6, 31.5; 204/164, 177; 418/178, 179, 60, 61; 123/193 C

[56] References Cited

UNITED STATES PATENTS

| | | | |
|---|---|---|---|
| 2,039,487 | 5/1936 | Lindemuth | 148/16.6 |
| 2,916,409 | 12/1959 | Bucek | 148/16.6 X |
| 2,946,708 | 7/1960 | Berghaus et al. | 148/16.6 |
| 3,033,180 | 5/1962 | Bentele | 418/179 X |
| 3,035,205 | 5/1962 | Berghaus et al. | 204/164 X |
| 3,190,772 | 6/1965 | Berghaus et al. | 148/16.6 X |
| 3,536,602 | 10/1970 | Jones et al. | 148/16.6 X |
| 3,575,537 | 4/1971 | Yamamoto | 418/178 |

FOREIGN PATENTS OR APPLICATIONS

| | | | |
|---|---|---|---|
| 1,155,864 | 6/1969 | United Kingdom | 148/16.6 |

*Primary Examiner*—C. Lovell
*Attorney, Agent, or Firm*—Bacon & Thomas

[57] ABSTRACT

The friction surface of a cast iron side wall member for a rotary piston engine is hardened by iontriding in an electrical glow discharge in a gas atmosphere containing nitrogen, after coating the areas not to be hardened, to inhibit glow discharge at those areas.

2 Claims, 4 Drawing Figures

COMPONENTS OF A ROTARY PISTON MACHINE

Figure 1:
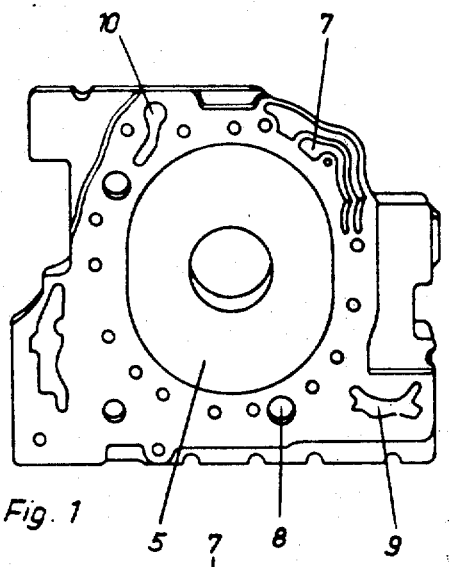

Matter enclosed in heavy brackets [ ] appears in the original patent but forms no part of this reissue specification; matter printed in italics indicates the additions made by reissue.

BACKGROUND OF THE INVENTION

The present invention relates to an iron or steel component, subject to friction, for a rotary piston machine, particularly to its double-walled side member, central portion or trochoid housing made of cast iron. The present invention furthermore relates to a process of producing such components subject to friction.

In the operation of such rotary piston machines the maximum achievable operational life is essentially determined by the components subject to friction. These components possess large flat surface areas over which the rotating piston wipes with its sealing strips so that a comparatively large frictional stress occurs. Since the rotary piston edges or sealing strips wiping over these surface areas must ensure a gas-tight seal, only small wear of these areas is admissible. Accordingly, it has for some time been attempted to make these components, or at least their surface areas subject to friction, as wear-resistant as possible. However, this problem is difficult to solve because it involves complex components, particularly because the two-walled side or central portions are provided with a large number of bores and connections. If at all, such double-walled cast-iron components with major wiped surfaces subject to friction may, however, be treated with the previously usual processes for surface hardening only with great difficulty.

Hardening of the wiped areas of such components has so far been effected with varying results in well-known metal spraying processes which, however, constitute a most expensive treatment which is moreover dangerous owing to possible adverse effects on health. Apart from the fact that the raw materials employed, such as molybdenum, can often only with difficulty be obtained in the quantities required for the treatment of a large number of components, the wiped surfaces provided with such a coat must subsequently be reground, which results in a further cost increase. Reworking such coated areas following a certain period of operation of the rotary piston machines has so far not been possible.

Again, the so-called induction hardening of such wiped areas is possible, but in view of the great stresses arising in the operation of such rotary piston machines such hardened wiped surfaces are not sufficiently wear-resistant in order to ensure satisfactory operational life. The deformations occurring in such a treatment are in addition so pronounced that they require regrinding and can hardly be eliminated nonetheless.

Experiments made with salt-bath nitriding and also with thermal gas nitriding produced no acceptable result because the hardening process was there not limited to the wiped surfaces proper but resulted in subjecting the components in question to nitriding as a whole. In view of the complex double-walled castings with their irregular bores, experience has shown that deformation occurs so that the desired high precision of the wiped areas is no longer ensured. In addition, the absorption of certain quantities of nitrogen in the base material results in a change in size, which cases substantial difficulties in respect of preserving the necessary dimensional accuracy. Moreover, residues of the nitriding bath, which can virtually not be removed, are formed particularly in salt-bath nitriding complex hollow components.

Despite the failure of the common nitriding processes, applicant has undertaken to achieve the desired properties using the ionitriding process. In so doing, it has surprisingly found that it is possible in so-called ionitriding by means of an electrical glow discharge in a gas atmosphere containing nitrogen, to produce, with adequate control of the ionitriding process, such components which have outstandingly good running properties without necessitating reworking of the components that have previously been processed to their final dimensions.

The present invention relates to such an iron or steel component, which is subject to friction, for a rotary piston machine, particularly for its double-walled side unit, central unit or trochoid housing made of cast iron, which is characterized in that the surfaces limited to the wiped areas are hardened by ionitriding with an iron nitride zone reduced to less than 10 microns thickness and with a surface roughness of a maximum of $R_2 = 0.8$ micron, with a corrosion resistance relative to combustion residues of fuels increased by at least 300 percent, with a thermal resistance up to 500°C over long periods or up to 800°C over short periods, and with a ductility reduced by a maximum of 10 percent as compared with the basic material.

The invention furthermore relates to a method of producing the component subject to friction according to this invention, ionitriding being performed by means of an electrical glow discharge in a gas atmosphere containing nitrogen at an elevated temperature in a treatment chamber, characterized in that the said component is provided with a coating inhibiting the electrical glow discharge on the surfaces outside the wiped surfaces proper, then ionitriding the surfaces of the wiped areas after inserting the component in the treatment chamber for at least five hours at a gas pressure of 0.1 – 5 mmHg and an operating voltage above 500 Volts, the said operating voltage and the gas pressure being so controlled that the iron nitride zone is partly removed by spattering metal particles from the surface and the thickness of the zone thus held below 10 microns.

Figure 2:
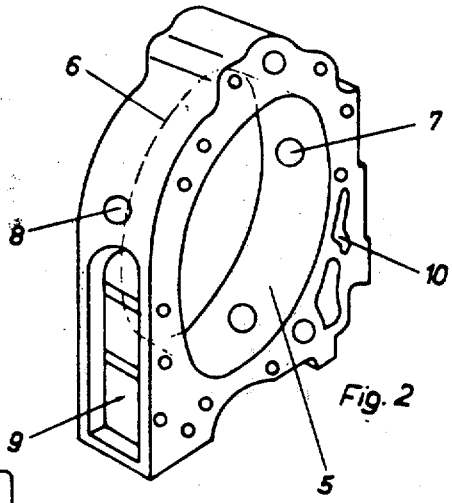
Figure 3:
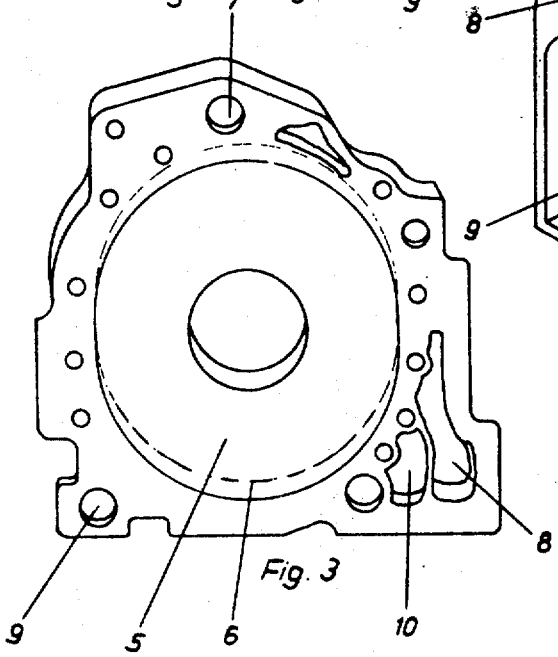
Figure 4:
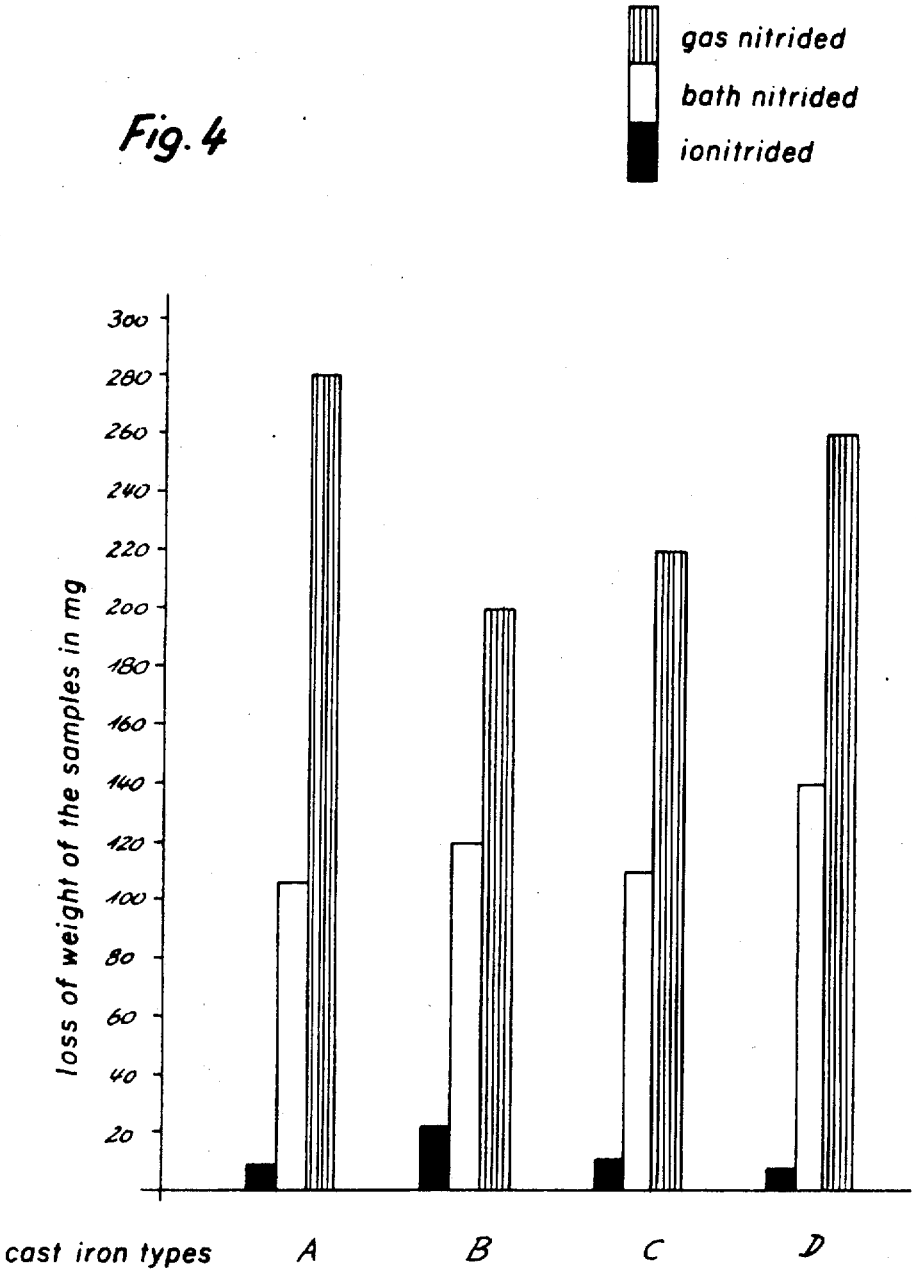

The invention is explained in greater detail in FIGS. 1 through 4 of the enclosed drawing in which FIG. 1 shows a double-walled side driving disk of a rotating piston machine, FIG. 2 a double-walled trochoid housing of a rotary piston machine, FIG. 3 a double-walled central unit of a rotary piston machine, shown partly in section, FIG. 4 a diagram of various wear resistances of nitrided wiped surfaces.

The components diagrammatically shown in FIGS. 1, 2 and 3 for single, double and multi-chamber rotary piston machines are double-walled hollow bodies made of iron or steel, preferably cast iron. With the components shown in FIGS. 1, 2 and 3 the wiped areas of the visible portions are designated at 5 and those of the invisible portions indicated by the dot-dash line 6. In operation, the rotating piston wipes these wiped areas with its sealing edges and, respectively, sealing strips so that the entire wiped area is subject to friction. The numerals 7, 8, 9 and 10 indicate some of the numerous perforations and connections which are required to supply and remove cooling water, fuel mixture, exhaust gases and the like. With such components of a rotary piston machine as shown diagrammatically in FIGS. 1, 2 and 3, the wiped areas must naturally be completely smooth and, with the double sides of the central portion as per FIG. 3 they must be perfectly plane parallel on the front and, respectively, rear flat sides; any deformation of the complex hollow bodies during the hardening process would make the wiped areas and, respectively, the entire component useless.

With complex components of the type shown in FIGS. 1, 2 and 3, hardening of the wiped areas by means of bath nitriding is virtually impossible if only owing to the unavoidable residues, which can hardly be removed from the inside of the hollow body; at the same time the unsymmetrically arranged openings would render it impossible to avoid pronounced deformation during the nitriding treatment. Again, in thermal gas nitriding the openings 7, 8, 9, 10 would cause heavy deformation of the entire component. In addition, the two said niriding methods would result in that the distance between the plane parallel wiped areas would be increased owing to the absorption of nitrogen by the basic material so that additional processing of the said wiped surface would be required. In contradistinction, ionitriding of components of the type shown in FIGS. 1, 2 and 3 provides the possibility of equipping all surfaces located outside the wiped areas proper with suitable coatings which prevent the occurrence of an electrical glow discharge at those points and thus the penetration of nitrogen into these parts of the surface. For a coating, mechanical coatings or also a coating made by an applicable compound may, by way of example, be selected, which serve the purpose. The said coatings may also be limited to the direct vicinity of the openings since it is only they that would cause deformations of the component during nitriding; this applies particularly to insert disks which may be provided in the areas of the sides subject to wear in the bodies according to FIGS. 1 and 3.

After coating the areas of the surface not requiring ionitriding, the said components of a rotary piston machine or parts thereof are placed, individually or together with other associated components, in the treatment chamber usual for ionitriding and arranged in such a manner that an electrical glow discharge may freely form on the wiped surfaces to be ionitrided. The component should in the usual manner have a negative potential at least occasionally, as described in greater detail in applicant's patent specifications so that lengthy descriptions are superfluous.

In ionitriding the wiped surfaces of components, which are subject to wear, of rotary piston machines, however, it is of great importance in order to meet the great demands made of the resistance to wear of the wiped areas that the treatment is effected for at least 5 hours at a gas pressure in the range of 0.1 and 5 mmHg and an operating voltage in excess of 500 Volts, preferably between 600 and 1,000 Volts. The operating voltage and the gas pressure must be so regulated that the spattering of metal particles from the surface of the wiped areas is obtained and that the iron nitride zone created by the ionitriding process is partly removed. Despite the comparatively long period of treatment the iron nitride zone should be kept at below 10 microns by the simultaneous spattering from the wiped areas. So if the components as indicated in FIGS. 1, 2 and 3 are ionitrided in the manner described above, the surface hardened by ionitriding is substantially limited to the wiped areas which are provided with an iron nitride zone of less than 10 microns and possess a surface roughness of a maximum of $R_a = 0.8$ micron. The Vickers hardness HV 0.2 of the ionitrided surface areas exceeds 450 kp/mm$^2$, and the wiped surfaces so ionitrided possess increased resistance to corrosion against the combustion residues of the usual fuels. The thermal resistance of the wiped areas and, respectively, the components amounts to about 500°C over long periods, but to 800°C and above over short periods. Against the basic material the wiped areas possess, despite the great hardness, a ductility which is reduced by not more than 10 percent. The above-mentioned favorable properties of the wiped areas hardened by ionitriding permit of expecting, in comparison with other surface hardening treatments, greater resistance to wear than those treated in other surface hardening processes. In order to prove the increase in wear resistance, a large number of wear tests were performed with Amsel wear testers. FIG. 4 shows the results in the form of a diagram.

It was found that, with ionitrided wiped surfaces according to the present invention, not only the mechanical wiping wear is smaller but also such wear as is caused by so-called tribochemical applications in the wear process. Connected therewith is the fact that wiped areas so treated also possess a substantially higher resistance to corrosion by combustion residues of fuels. As previously stated, the wiped surfaces of the components ionitrided according to this invention of rotary piston machines also possess greater thermal resistance than surfaces hardened by other methods. By way of example, the thermal resistance obtained in induction hardening is always below 400°C and, in case hardening the thermal resistance hardly exceeds 150°C. On the other hand, the wiped surfaces treated in accordance with this invention reveal a thermal resistance of 400°C over extended periods and of 800°C or higher over short periods.

Life tests were finally performed on rotary piston machines of the one and two-chamber design with the components according to this invention. It has been found that the components according to this invention provide an increase in the operational life of such machines and, respectively, engines in the order of two or three times the original value. It has further been found that used components of this type can be reconditioned, which constitutes a considerable advantage over the treatment of the surfaces by spraying them with molybdenum.

What is claimed is:

[1. A trochoid housing for a rotary piston machine, made of cast iron and provided with ionirided hardened areas limited to the wiped surfaces; charcterized in that the hardened areas throughout the wiped areas are provided with an iron nitride zone reduced to less than 10 microns thickness, with a surface roughness not exceeding $R_a = 0.8$ micron, with a corrosion resistance relative to fuel combustion residues increased by at least 300 percent, with a thermal resistance up to 500°C over long periods and, respectively, up to 800°C over short periods and with a ductility reduced by not more than 10 percent as compared to the basic material.]

[2. A method of producing a cast iron trochoid housing for a rotary piston machine in which ionitriding is performed by means of an electrical glow discharge in a gas atmosphere containing nitrogen at elevated temperature in a treatment chamber, the said housing being provided with means inhibiting the electrical glow discharge on the surfaces outside the wiped areas proper prior to ionitriding, characterized in that the said areas are ionitrided after insertion in the treatment chamber during at least 5 hours at a gas pressure in the range of 0.1 – 5 mmHg and an operating voltage of more than 500 volts, the operating voltage and the gas pressure being so controlled that the sputtering of metal particles from the surface of the wiped areas partly reduces the iron nitride zone and keeps it below 10 microns.]

*3. Trochoid housings, side and central units for a rotary piston machine, made of a material selected from the group consisting of iron and steel, particularly cast iron, and provided with ionitrided hardened areas limited to the wiped surfaces; characterized in that the hardened areas throughout the wiped areas are provided with an iron nitride zone reduced to less than 10 microns thickness, with a surface roughness not exceeding $R_a=0.8$ micron, with a corrosion resistance relative to fuel combustion residues by at least 300 per cent, with a thermal resistance up to 500°C over long periods and, respectively, up to 800°C over short periods and with a ductility reduced by not more than 100 per cent as compared to the basic material.*

*4. A method of producing trochoid housings, side and central units for a rotary piston machine made of a material selected from the group consisting of iron and steel in which ionitriding is performed by means of an electrical glow discharge in a gas atmosphere containing nitrogen at elevated temperature in a treatment chamber, said trochoid housings, side and central units being provided with means inhibiting the electrical glow discharge on the surfaces outside the wiped areas proper prior to ionitriding, characterized in that the said areas are ionitrided after insertion in the treatment chamber during at least 5 hours at a gas pressure in the range of 0.1 – 5 mmHg and an operating voltage of more than 500 volts, the operating voltage and the gas pressure being so controlled that the sputtering of metal particles from the surface of the wiped areas partly reduces the iron nitride zone and keeps it below 10 microns.*

* * * * *